March 2, 1926.

H. A. AFFEL 1,574,780

MEANS FOR AND METHOD OF MODULATION

Filed Oct. 5, 1921

3 Sheets-Sheet 1

Inventor
H. A. Affel
By his Attorney

March 2, 1926.  
H. A. AFFEL  
1,574,780  
MEANS FOR AND METHOD OF MODULATION  
Filed Oct. 5, 1921  
3 Sheets-Sheet 2

Inventor
H. A. Affel
By his Attorney

March 2, 1926.

H. A. AFFEL 1,574,780

MEANS FOR AND METHOD OF MODULATION

Filed Oct. 5, 1921

3 Sheets-Sheet 3

Inventor
H. A. Affel
By his Attorney

Patented Mar. 2, 1926.

1,574,780

UNITED STATES PATENT OFFICE.

HERMAN A. AFFEL, OF BROOKLYN, NEW YORK, ASSIGNOR TO AMERICAN TELEPHONE AND TELEGRAPH COMPANY, A CORPORATION OF NEW YORK.

MEANS FOR AND METHOD OF MODULATION.

Application filed October 5, 1921. Serial No. 505,530.

*To all whom it may concern:*

Be it known that I, HERMAN A. AFFEL, residing at Brooklyn, in the county of Kings and State of New York, have invented certain Improvements in Means for and Methods of Modulation, of which the following is a specification.

This invention relates to translating devices and more particularly to means for variably controlling the amplitude of the output current from a transmission circuit with reference to the amplitude of the input current applied by the circuit.

One of the objects of the invention is to produce an amplifying or translating device whose amplification may be made to vary for different amplitudes of input current. Another object of the invention is to control the amplification of an amplifying device directly by the amplitude of the input current supplied by the device. Another object of the invention is to provide a translating device which will discriminate between input currents of different amplitudes. Another object of the invention is to provide a vacuum tube amplifier whose static grid potential will be a function of the amplitude of the input currents. It is further intended that any of these actions may be carried on with substantially no distortion of the wave form of the incoming current.

These objects, as well as other objects of the invention more fully appearing hereinafter, are accomplished by applying to a rectifier or distorting arrangement a portion of the input energy to be transmitted through a translating system, and using the rectified energy for determining the static grid potential of a vacuum tube amplifier. By suitable adjustments of the characteristics of the amplifier and the rectifying or distorting arrangement any desired relation within reasonable limits may be obtained between the amplitudes of the input and output currents of the system.

Figure 1:
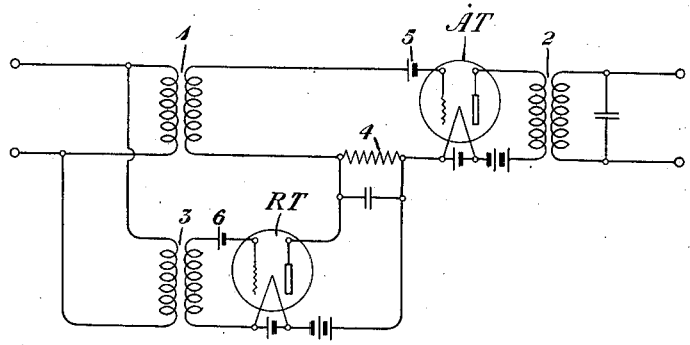

The invention may now be more fully understood from the following description when read in connection with the accompanying drawing, Figure 1 of which is a circuit diagram of an arrangement embodying the principles of the invention, and Figs. 2 to 8 inclusive of which are curves illustrating the operation of the arrangement disclosed in Fig. 1.

Referring to Fig. 1, AT designates a vacuum tube amplifier to the grid circuit of which input energy may be applied through a transformer 1, and from which output energy may be drawn through a transformer 2. The amplification of the tube AT may be varied by variably adjusting the static grid potential of the tube. In order to adjust the static potential of the grid and hence the amplification of the tube in accordance with the amplitude of the input current, a rectifying tube RT is provided. The rectifying tube RT is so arranged that a portion of the input energy applied by the transformer 1 may be applied to the grid circuit of the rectifying tube through a transformer 3. The output circuit of the rectifying tube RT is connected across the terminals of a resistance 4 in the grid circuit of the amplifier AT, so that the rectified potential will determine the potential of the grid of the amplifier AT. As the rectified potential will be a function of the amplitude of the input energy applied to the amplifier AT, the amplification of the amplifier AT may thus be made to depend upon the amplitude of the input energy. The usual C battery 5 may be applied to the grid circuit of the amplifying tube AT to determine its normal grid potential and a similar battery 6 may be applied to the grid circuit of the rectifier RT to determine the normal potential of the grid of the rectifier.

By suitably adjusting the elements of the tubes RT and AT to obtain desired characteristics, and by suitably adjusting the proportions of energy applied directly to the amplifying tube and directly to the rectifying tube, it is thought possible to obtain, within reasonable limits, any desired relation between the amplitude of the input current and the amplitude of the output current of the system, and depending upon these adjustments, different operating requirements may be met.

For example, the translating arrangement above described may be used to equalize the current output of the system for input amplitudes above some critical value. This would permit of stabilizing the operation of some relay or other translating device independent of substantial input current variations.

Figure 2:
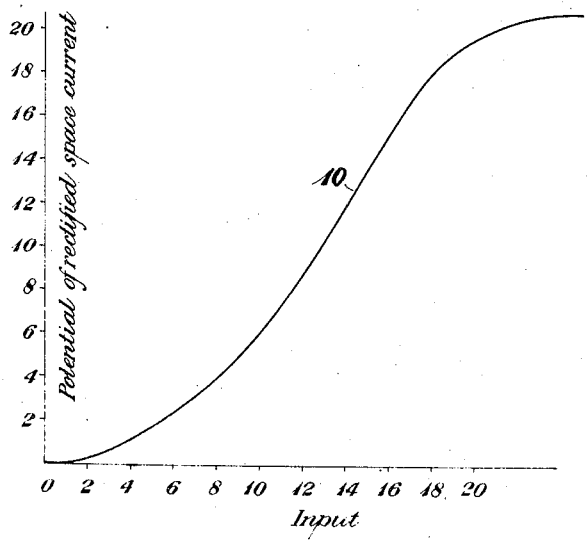

In order to understand quantitatively how such a result may be obtained, attention is called to the curves of Figs. 2 to 5 inclusive. In Fig. 2 the curve 10 shows the variation of the potential of the rectified space current of the tube RT for different amplitudes of input current. This curve, it will be noted, is similar in form to the usual characteristic curve of a three-element vacuum tube as plotted between grid potential and space current; in fact, the curve 10 may be considered as a reproducton of the characteristic curve of the tube since the input energy is a direct function of the grid potential, and the potential of the rectified space current is directly proportional to the plate current of the tube.

Figure 3:
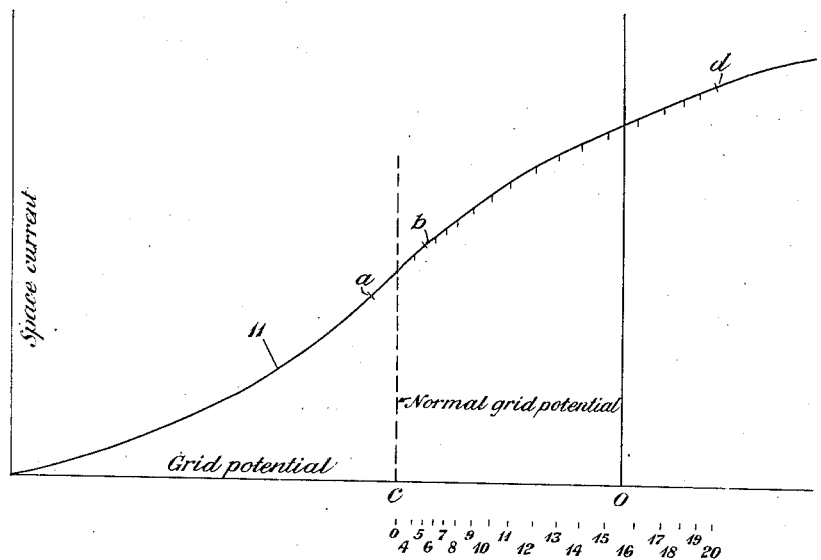

In Fig. 3, 11 may be taken as the characteristic curve of the amplifying tube AT, the curve being plotted between grid potential and space or plate current, as is the common practice. This curve may be given various forms by suitable adjustments of the constants of the tube as is well known, and in the instance given, the characteristic curve 11 is substantially a straight line between the points $a$ and $b$. Over this portion of the curve the amplification will be constant. Above the point $b$ the curve gradually flattens out so that the slope of the curve is decreased. The same is true of the portion of the curve below the point $a$. As the amplification of the tube depends upon the slope of the characteristic curve over the range in which the tube is operating, it will be apparent that the amplification gradually decreases above the point $b$ until the slope is decreased to such a point that, depending of course on the absolute values of the constants involved, an actual loss in transmission may possibly occur, instead of a gain. The same thing may hold true for the portion of the curve below the point $a$.

Let us assume that with the grid of the amplifying tube AT at neutral or zero potential a space current would flow as indicated at $o$. The potential of the grid battery 5 may be then so fixed that the tube will normally operate at the point $c$, which is here taken as the midpoint of the straight line portion of the characteristic. Let us further assume that the amplitude of the input energy, as applied to the grid of the amplifying tube AT, is sufficiently small so that at any given instant the variation in amplitude will be within a relatively narrow portion of the characteristic. This will insure a minimum distortion of the input wave form. Let us assume that the rectified output potential of the rectifying tube RT will be of sufficient amplitude in the case of the greatest amount of input energy to be considered so that when said rectified potential is applied to the grid circuit of the amplifier, it will shift the operating point of the curve from the point $c$ to a point well along the upper portion of the curve, as for example, the point $d$. In general these assumptions would probably mean that tube AT would be of larger physical dimensions that tube RT.

In the case assumed, the rectified potential will be applied in such a direction as to oppose the potential of the grid battery 5, so that as the amplitude of the input energy is increased the normal grid potential will become less and less negative, thus shifting the operating point further upward over the curve. The values of the controlling potentials for the amplifying tube for different values of input current may be obtained from the curve 10 of Fig. 2. These values are indicated by the points laid out immediately below the horizontal axis of the curve, the points being designated by the numbers indicating the corresponding input amplitudes. In other words, the points indicate values of rectified potential but the numbers applied to the points refer to corresponding input amplitudes.

Figure 4:
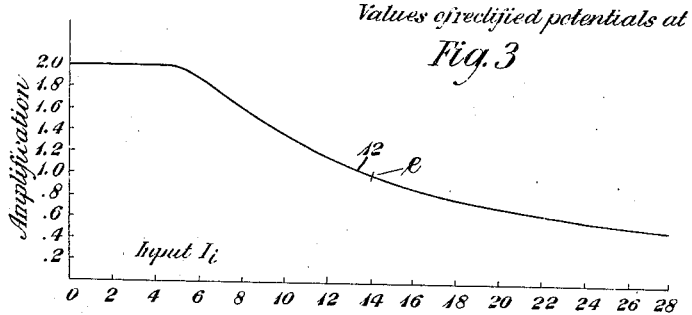

The amplification of the tube at any given input amplitude may be obtained by determining the slope of the curve 11 at a point immediately above the number designating a given input potential in Fig. 3. Curve 12 of Fig. 4 is a plot of the amplification of the tube for different amplitudes of input current, as determined from the curve 11 of Fig. 3. For example, if the input current applied to the amplifier is zero, the static grid potential of the amplifying tube will be the normal grid potential indicated at $c$ in Fig. 3. At this point the slope of the curve is forty-five degrees, which is arbitrarily assumed, for purposes of illustration, to correspond to an amplification of two times. As the amplitude of the input current is increased up to five units, the slope remains the same and hence the amplification as plotted in Fig. 4 is the same, consequently the curve 12 is horizontal out to this point. As the amplitude is increased the slope of the curve decreases for amplitude beyond five units, so that the amplification correspondingly decreases. For example, for an input current of 14 units, in Fig. 3, the slope of the curve is such that the amplification is unity. As the slope decreases beyond this point with corresponding decrease in amplification, the functioning of the tube represents an actual loss in transmission. Thus, in the curve 12 of Fig. 4, the portion of the curve to the right of the point $e$ represents a loss in transmission, and that portion of the curve to the left of the point $e$ represents a gain.

Figure 5:
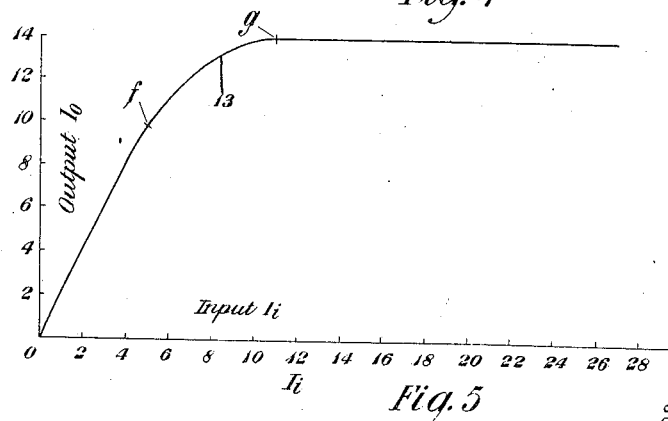

In order to obtain a clear picture of the relation between the input amplitude and the output amplitude for the system, it is necessary to translate the values of amplification in Fig. 4 into values of output current. Since the amplification is merely the ratio of the output current $I_o$ to the input current $I_i$ the value of the output current may be obtained for each value of input current by multiplying the input current by the amplification as obtained from the curve 12. The curve 13 of Fig. 5 is obtained by plotting input currents against the output currents thus obtained. An inspection of the curve 13 shows that up to the point $f$, corresponding to an input current of five units, the output current increases by a constant ratio so that the curve is a straight line to this point. As the amplification falls off beyond this point the slope of the curve changes and beyond the point $g$, corresponding to about eleven units of input current, the curve remains horizontal, in other words, for input currents greater than eleven units, the output current of the system will be constant.

This equalization of the amplitude of the output current for any input amplitude above a given limiting value may be obtained by suitable adjustment of the constants of the two tubes involved, and is not dependent upon the particular values above described, these values merely being assigned arbitrarily in order to obtain a quantitative understanding of the principles underlying this aspect of the invention. Other adjustments may be used to give different results, for example, by suitable adjustments, the apparatus may be made to function as a marginal discriminating device in which the greatest action of a relay or other piece of detecting apparatus in the output circuit obtains when the input current is of a particular value and values of input current greater or less than this particular value will be discriminated against. Such a device might be used, for example, in the reduction of interference in carrier or radio transmission systems. In such a case the normal signal would be received at the amplitude for which a maximum output current will obtain. If an interfering current of greater or less value than a signaling current is impressed upon the system, the output current will be considerably decreased, so that the marginal responsive device will be unaffected.

Figure 6:
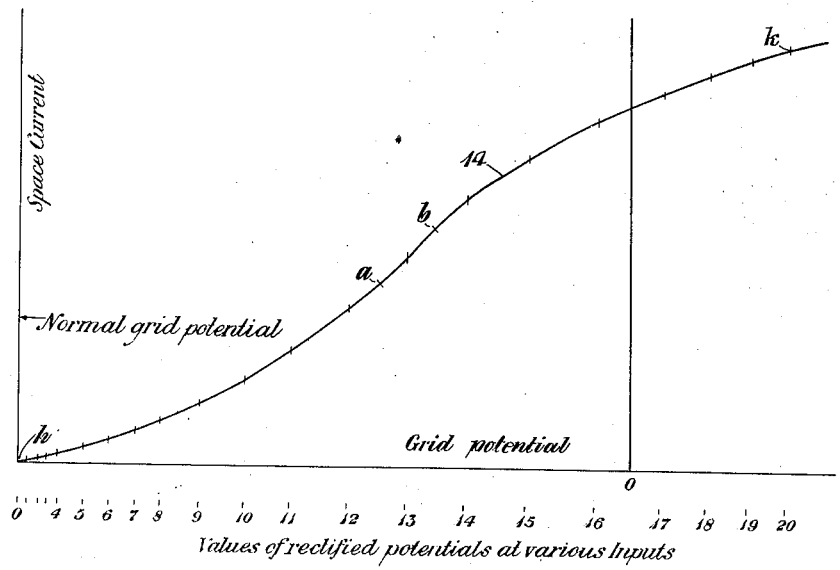
Figure 7:
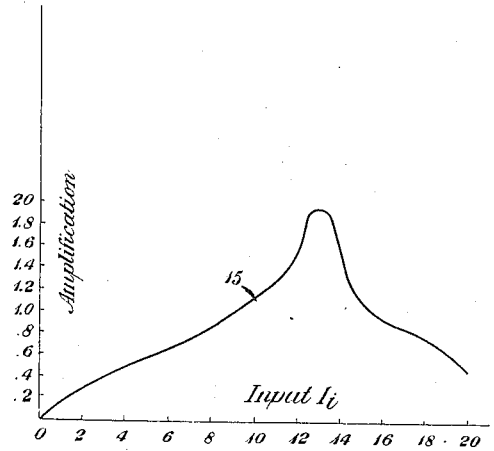
Figure 8:
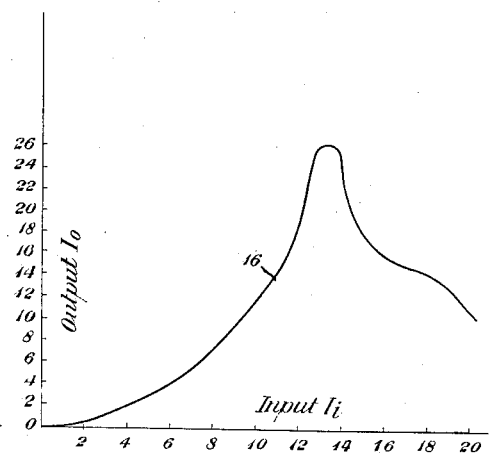

In order to obtain a quantitative idea of how the tube should be adjusted in order to secure this result, attention is called to the curves of Figs. 6, 7 and 8. In Fig. 6 the curve 14 is the characteristic curve of the amplifier AT plotted in the usual manner between grid potential and plate current. For purposes of illustration this curve is made identical with the curve 11 of Fig. 3, the amplification being uniform between points $a$ and $b$ and decreasing when the operation of the tube is at points beyond $a$ and $b$.

It will be remembered that in order to obtain the equalization of the output current as above described, the apparatus of Fig. 1 was adjusted so that the amplifying tube operated from a point $c$ intermediate between the points $a$ and $b$ to a point on the curve, as indicated at in Fig. 3. In the present instance it is proposed to operate along the curve from the point $h$ to the point $k$. The grid battery 5 is therefore adjusted so that the normal grid potential will be negative, a sufficient number of volts to prevent any space current from flowing. While it is not necessary that the normal grid potential should be such as to prevent any space current from flowing, the grid should be normally sufficiently negative so that the tube would be operating on the lower part of its characteristic where the amplification is low.

The rectified controlling potential applied to the grid circuit from the tube RT must, in the case of the maximum input energy to be considered, be sufficient to shift the operating point of the curve to a point of low amplification on the upper part of the curve beyond the point $b$. Accordingly the constants of the tube RT will be adjusted to increase its amplification or the component of the output potential to be applied to the amplifying tube will be increased so that the range of rectified potentials corresponding to various inputs will extend from, say, the point $h$ to the point $k$ in Fig. 6. The various rectified potentials corresponding to the current input values will be obtained as before from the curve 10 of Fig. 2, and the points below the horizontal axis in Fig. 6 represent potentials corresponding to different input amplitudes.

As in the case of Fig. 3, the amplification for any given grid potential will depend upon the slope of the curve at that point. The rectified potentials applied to the grid circuit of the amplifying tube AT tend to neutralize the normally negative potential of the grid more and more as the amplitude of the input current increases. The amplification of the tube for a given input current may be obtained by determining the slope of the curve 14 at a point immediately above the number representing the desired input in the row of numbers below the horizontal axis of Fig. 6. By plotting the values of the amplification for different values of the input current in a manner similar to that described in connection with Fig. 4, the curve 15 of Fig. 7 will be obtained. From this curve it will be seen that the amplification for an input current of zero value will be zero and the amplification gradually increases to a maximum for an input current of 13 units, this input current corresponding to the intermediate point of the straight portion of the characteristic curve lying between $a$ and $b$ in Fig. 6. The amplification then decreases for further increase in the input current, this being due to the falling off of the slope of the curve 14 in Fig. 6.

The output current values may be obtained by multiplying the input current by the amplification, as described in connection with Fig. 5. By plotting input currents along the horizontal axis and output currents along the vertical axis, the curve 16 of Fig. 8 is obtained. An inspection of this curve shows that as the input current is increased up to a value in the neighborhood of 13 units, the output current increases, the increase being very rapid in the neighborhood of 13 units, which point corresponds to the maximum output current. For further increase in the amplitude of the input current, the output current falls off very rapidly. It follows at once from an inspection of the curve in Fig. 8, a system such as that described may be made highly discriminatory with regard to the amplitude of the input current.

It will be obvious that the general principles herein disclosed may be embodied in many other organizations widely different from those illustrated without departing from the spirit of the invention as defined in the following claims.

What is claimed is:

1. The method of varying the amplification of a vacuum tube amplifier which consists in producing a current whose amplitude is proportional to the envelope of the alternating input energy applied to the tube and in adjusting the static grid potential in accordance with the amplitude of the current so produced.

2. The method of controlling the amplification of a vacuum tube amplifier which consists in rectifying a portion of the input energy and applying the direct current component of the rectified energy to the grid circuit of the tube to determine the static potential thereof.

3. The method of controlling the amplification of a vacuum tube amplifier which consists in rectifying a portion of the input energy and applying the direct current component of the rectified energy to the grid circuit of said amplifier to adjust the amplification in accordance with the static potential applied by the grid.

4. The method of operating a translating circuit, including a three-element vacuum tube, which consists in producing a current whose amplitude is proportional to the envelope of the alternating input energy applied to the tube and in so controlling the static grid potential of the vacuum tube in accordance with the amplitude of the current so produced that a predetermined relation between the input energy applied to the system and the ouput energy from the system will be obtained.

5. The method of operating a translating circuit, including a three-element vacuum tube, which consists in producing a current whose amplitude is proportional to the envelope of the alternating input energy applied to the tube and in so controlling the static potential of the grid of the tube in accordance with the amplitude of the current so produced that the output energy will be a maximum for a predetermined amplitude of the input energy.

6. The method of operating a translating circuit, including a three-element vacuum tube, which consists in producing a current whose amplitude is proportional to the envelope of the alternating input energy applied to the tube and in so controlling the static potential of the grid of the tube in accordance with the amplitude of the current so produced that the system will discriminate against input energies having amplitudes less than a predetermined maximum.

7. The method of operating a translating circuit, including a three-element vacuum tube, which consists in producing a current whose amplitude is proportional to the envelope of the alternating input energy applied to the tube and in so controlling the static potential of the grid of the tube in accordance with the amplitude of the current so produced that the system will discriminate against input energies having amplitudes greater than a predetermined amplitude.

8. The method of operating a translating circuit, including a three-element vacuum tube, which consists in so controlling the static potential of the grid of the tube in accordance with the amplitude of the input energy that the system will transmit the greatest output energy for a predetermined input energy and the output energy will be less for input amplitudes either greater or less than the predetermined amplitude.

9. The method of operating a translating circuit, including a three-element vacuum tube, which consists in applying input energy to the tube, rectifying a portion of the input energy before it is applied to the tube, and so controlling the static potential of the tube by means of the direct current component of the rectified energy that a predetermined ratio between the input energy applied to the system and the output energy transmitted from the system will be obtained.

10. The method of operating a translating circuit, including a three-element vacuum tube, which consists in applying input energy to the tube, rectifying a portion of the input energy before it is applied to the tube, and so controlling the static potential of the tube by means of the rectified energy that the system will discriminate against input energies having amplitudes less than a predetermined maximum.

11. The method of operating a translating circuit, including a three-element vacuum tube, which consists in applying input energy to the tube, rectifying a portion of the input energy before it is applied to the tube, and so controlling the static potential of the tube by means of the direct current component of the rectified energy that the system will discriminate against input energies having amplitudes greater than a predetermined amplitude.

12. The method of operating a translating circuit, including a three-element vacuum tube, which consists in applying input energy to the tube, rectifying a portion of the input energy before it is applied to the tube, and so controlling the static potential of the tube by means of the rectified energy that the system will transmit the greatest output energy for a predetermined input energy and the output energy will be less for input amplitudes either greater or less than the predetermined amplitude.

13. The method of operating a vacuum tube amplifier which consists in producing a current whose amplitude is proportional to the envelope of the alternating input energy applied to the tube and in shifting the operating point of the tube along its characteristic axis in accordance with the amplitude of the current so produced.

14. The method of operating a vacuum tube amplifier which consists in applying thereto energy variations whose maximum amplitude will be relatively small as compared with the total range of the tube, and shifting the operating point of the tube along its characteristic curve to a point determined by the amplitude of the envelope of the alternating energy variations applied thereto.

15. The method of operating a vacuum tube amplifier which consists in applying energy variations to said amplifier having an amplitude relatively small as compared with the range of the tube, rectifying a portion of the energy and applying the direct current component of the rectified potential to the grid circuit of the tube to shift the working point of the tube along its characteristic curve in accordance with the amplitude of the energy variations.

16. In a translating system, a three-element vacuum tube, means to apply energy variations to said tube, means to produce a current whose amplitude is proportional to the envelope of the alternating energy so applied, and means to adjust the working point of said tube along its characteristic axis in accordance with the amplitude of the current so produced.

17. In a translating system, a three-element vacuum tube, means to apply energy variations to said tube, means to rectify a portion of the energy of said variations, means to apply the direct current component of the rectified potential to said vacuum tube to shift its working point along its characteristic curve in accordance with the amplitude of the energy applied by the tube.

18. In a translating system, a three-element vacuum tube, means to apply alternating currents to the grid circuit of said tube, means controlled by said alternating current for producing a direct current potential whose value is determined by the amplitude of said alternating current, and means to apply said direct current potential to said vacuum tube to control its operating point.

19. In a translating system, a vacuum tube amplifier, means to apply alternating current to the input circuit of said amplifier, a vacuum tube rectifier, means to apply said alternating current to said vacuum tube rectifier, thereby producing rectified direct current, and means to control the static potential of the grid of said vacuum tube amplifier in accordance with the amplitude of said rectified direct current.

In testimony whereof, I have signed my name to this specification this 21st day of September 1921.

HERMAN A. AFFEL.